March 20, 1962 G. R. BRAINERD 3,026,440

CONTROL CIRCUIT FOR ELECTROLUMINESCENT CELL

Filed Dec. 18, 1959

WITNESSES:

Bernard R. Giegue

James F. Young

INVENTOR
Gideon R. Brainerd
BY V. W. Cleary
ATTORNEY

3,026,440
CONTROL CIRCUIT FOR ELECTROLUMINESCENT CELL

Gideon R. Brainerd, Millersville, Md., assignor to Westinghouse Electric Corporation, East Pittsburgh, Pa., a corporation of Pennsylvania Filed Dec. 18, 1959, Ser. No. 860,503
6 Claims. (Cl. 313—108)

The present invention relates to electroluminescent circuits and more specifically to a circuit for actuating an electroluminescent cell or capacitor.

An object of the invention is to provide a circuit for actuating an electroluminescent cell.

Another object of the invention is the provision of a device which will supply a low frequency alternating voltage to an electroluminescent capacitor to effect illumination of the electroluminescent cell or capacitor.

Still another object of the invention is to provide a control circuit for an electroluminescent capacitor which will illuminate the electroluminescent cell and can be easily actuated or deactivated to thereby turn on or off the electroluminescent cell.

Still a further object of the invention is the provision of a control circuit for an electroluminescent cell which can be actuated to hold the cell illuminated in response to relatively short pulse and retain the cell illuminated until another discrete pulse is supplied to the device.

A still further object of the invention is to provide a control circuit for an electroluminescent cell or capacitor utilizing a negative resistance semiconductor such as a unijunction transistor or double base diode.

A further object of the invention is the provision of a control circuit for an electroluminescent cell or capacitor which will supply a low frequency alternating current voltage to the electroluminescent cell in response to a pulse and continue to supply this alternating voltage to the capacitor until a subsequent pulse is applied to the device.

Invention as well as additional objects and advantages thereof, will best be understood from the following description when read in connection with the accompanying drawing, in which.

Figure 1:
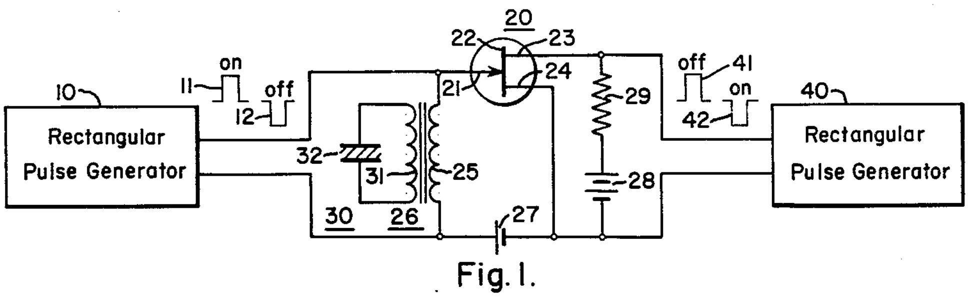
FIGURE 1 is a schematic circuit diagram of one embodiment of the invention.

The embodiment of the invention illustrated in FIG. 1 comprises a silicon unijunction transistor, sometimes called a double base diode 20 having an emitter and a base having two connections thereon. In the quiescent state the emitter 21 is back biased so as to have no emitter current. The base circuit of the semiconductor 20 is actuated to produce emitter current by applying either a pulse to the emitter circuit or to the base circuit. After application of one of these two pulses or of both, oscillations are set up in a load line 30 including an electroluminescent capacitor. Being a negative resistance semiconductor, the oscillations in the load line 30 are sustained by the emitter current of the semiconductor 20 so that illumination of the electroluminescent capacitor is sustained by the emitter circuit even after the actuating pulse has been removed. A second pulse being applied to the semiconductor 20, again back biases the emitter and the oscillations in the load line 30 are discontinued so as to switch off the electroluminescent cell.

More specifically the device illustrated in FIG. 1 comprises a rectangular pulse generator 10 which produces positive going pulses 11 selectively or negative going pulses 12. A single positive going pulse from the generator 10 will actuate the device to illuminate the electroluminescent cell whereas the negative going pulse 12 will turn off the cell. The pulse generator 10 is connected across an inductor member 25 which is a primary winding of the transformer 26. A unijunction transistor 20 includes an emitter 21 and a base 22 having two terminals 23 and 24 at the opposite ends thereof. The emitter circuit of the semiconductor 20 is connected between the base terminal 24 and the emitter 21 and includes a back bias supply 27 and the primary inductor or winding 25. The base circuit includes a load resistor 29 and a base voltage supply 28, connected between base terminals 23 and 24.

The inductor 25 is inductively coupled to an inductor 31 of the transformer 26. The load line of the emitter circuit 30, includes the secondary winding 31 and an electroluminescent cell 32.

A rectangular pulse generator 40 is connected across or between the base connections 23 and 24, to produce either a negative going pulse 41 or a positive going pulse 42. As will be explained, the negative going pulse 41 will actuate the semiconductor 20 to effect forward bias of the emitter and thereby initiate an emitter current in the device. Similarly the positive going pulse 11 from the generator 10 will result in forward biasing of the emitter to produce emitter current which will be sustained due to the negative resistance characteristic of the device.

When either an on pulse is produced from the generator 10 or from the generator 40 oscillations will be set up in the load line 30 to provide a low frequency alternating voltage to the electroluminescent capacitor 32 due to the negative resistance characteristic of the double diode 20 these oscillations will be sustained by the emitter circuit of the double diode 20 until such time as an off pulse is applied to the device by either the generator 10 or the generator 40.

Figure 2:
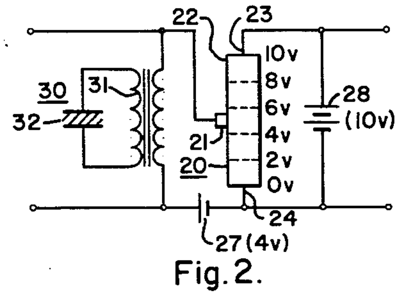
FIG. 2 is a schematic circuit diagram including the semiconductor employed in the embodiment illustrated in FIG. 1.

FIGURE 2 illustrates generally the operation of the semiconductor 20 as applied to the embodiment illustrated in FIG. 1. The double base diode 20 includes an end type silicon base with a p-type emitter 21. At either end of the base 22 are base connections 23 and 24 between which is applied a base voltage to establish voltage gradients between the base. The figures shown in FIG. 2 are for purposes of illustration and disregard any base resistance such as the base resistor 29 shown in FIG. 1. If the base voltage 28 is ten volts the voltage gradient will vary between the base connection 24 to the base connection 23 in voltage increments as shown in FIG. 2. The emitter 21 is connected at a predetermined point relative to the voltage gradient on the base 22. The emitter voltage 21 is chosen so that its voltage is less than the voltage gradient opposite the p-type material 21. By this connection and the voltage supply 27 the emitter is back biased thereby preventing an emitter current. As illustrated in FIG. 2, the emitter voltage 27 is four volts whereas the p-type emitter 21 is connected approximately opposite the five volt gradient of the base 22. Hence, the emitter 21 is back biased so that emitter current will not flow.

If the voltage between the base connections 23 and 24 is decreased sufficiently or if the voltage of the p-type junction is increased sufficiently, the emitter can become forward biased so as to provide emitter current in the emitter circuit. As illustrated above, this can be accomplished either by applying a positive pulse to the windings 25 to thereby increase the emitter potential or by applying a negative going pulse between the base terminals 23 and 24 thereby decreasing the voltage gradient of the base 22. This is done in the embodiment shown in FIG. 1 by the pulse generator 10 or by the pulse generator 40.

Figure 3:
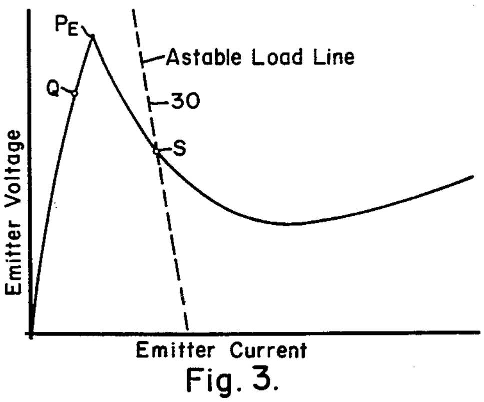
FIG. 3 is a characteristic curve of the semiconductor employed in the embodiment shown in FIG. 1.

When the potential of the emitter 21 exceeds the voltage gradient opposite the p-type material the emitter will be forward biased and bias current will flow, and the emitter circuit will pass from the point Q, shown in FIG. 3 to the point $P_E$ on the characteristic curve and through and into the negative resistance region on the characteristic curve shown at FIG. 3. FIG. 3 is a graph plotting emitter voltage against emitter current for the unijunction transistor 20 shown in solid lines. In dotted lines is the characteristic of the astable load line 30 plotted against the emitter voltage in current to produce an astable state in the load line 30. Hence the inner section of the characteristic curve of the unijunction transistor 20 and the characteristic curve of astable load line 30 represents the point at which oscillations will be sustained in the device.

Following the turn on pulse 11 or 41, emitter 21 of device 20 is biased on. Current flows in the emitter circuit which includes transformer primary 25. The voltage induced in transformer secondary 31 then inaugurates oscillations in the LC circuit composed of EL cell 32 and winding 31. This is fed back to 25 and varies the current in the emitter circuit such that variations in the current are effectively amplified by the negative resistance found in the emitter characteristic. These variations in current reinforce the oscillations found in LC circuit 32 and 31.

Figure 4:
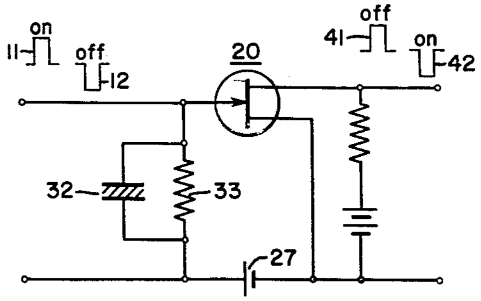

In the case of D.C. electroluminescent excitation, the unijunction ttransistor is utilized as a bistable trigger shown in FIG. 4. The emitter load line is now composed of EL cell 32 and resistor 33 shown in FIG. 4 and forms a load line for bistable operation. The emitter is biased rearwardly by source 27 until turned on by a pulse at which time the point of operation is shifted to point in the hyperconductive region of the semiconductor where it will remain until device 20 is triggered off. The voltage drop across resistor 33 is used to excite the D.C. EL cell 32.

As can be understood this embodiment could be turned on by pulses 11 or 42, shown in FIG. 4, and turned off by pulses 12 or 41. The first stable state of the device is when the emitter is rearwardly biased with no emitter current and the EL cell therefore is not excited. When a pulse 11 or 41 is applied to the device the double base diode 20 is swung into the hyperconductive region so that there will be emitter current and the EL cell 32 will be excited.

While the present invention has been described with reference to a particular embodiment thereof it will be understood that numerous modifications may be made by those skilled in the art without actually departing from the invention.

I claim as my invention:

1. An electroluminescent device comprising a double base diode having an emitter and a base electrode, a direct-current voltage supply for establishing a voltage gradient along said base, an emitter circuit including a first winding means and said emitter, means for normally back biasing said emitter, a second winding means inductively coupled to said first winding means, an electroluminescent capacitor connected across said second winding means, and means for selectively forward biasing said emitter.

2. An electroluminescent device comprising a double base diode having an emitter and a base electrode, a direct-current voltage supply for establishing a voltage gradient along said base, an emitter circuit including a first winding means and said emitter, bias means for back biasing said emitter, a second winding means inductively coupled to said first winding means, an electroluminescent capacitor connected across said second winding means, and means for applying a signal across said first winding means to forward bias said emitter and render said emitter circuit conductive.

3. An electroluminescent device comprising a double base diode having an emitter and a base electrode, a direct-current voltage supply for establishing a voltage gradient along said base, an emitter circuit including a first winding means and said emitter, bias means for back biasing said emitter, a second winding means inductively coupled to said first winding means, an electroluminescent capacitor connected across said second winding means, and means for applying a signal to said first and said second winding means to forward bias said emitter.

4. An electroluminescent device comprising a double base diode having an emitter and a base electrode, a direct-current voltage supply for applying a potential across said base electrode, an emitter circuit including a first winding means and said emitter, said emitter being normally back biased, a second winding means inductively coupled to said first winding means, an electroluminescent capacitor connected across said second winding means, and means for applying a signal across said base to effect forward bias of said emitter.

5. An electroluminescent device comprising a double base diode having an emitter and a base electrode, a direct-current voltage supply for applying a voltage across said emitter and establishing a voltage gradient along said base, an emitter circuit including a first winding means, an emitter bias supply, and said emitter, said emitter bias supply normally rendering said emitter back biased, a second winding means inductively coupled to said first winding means, an electroluminescent capacitor connected across said second winding means, and a pulse generator connected across said first winding means for selectively applying a pulse thereto to effect forward bias of said emitter.

6. An electroluminescent device comprising a double base diode having an emitter and a base electrode, a pair of base terminals connected on opposite sides of said base, a direct-current voltage supply connected between said pair of terminals for establishing a voltage gradient along said base, an emitter circuit including a first winding means, an emitter bias supply, one of said pair of base terminals, and said emitter, said emitter being normally back biased, a second winding means inductively coupled to said first winding means, an electroluminescent capacitor connected across said second winding means, and a pulse generator connected across said first winding means for applying a forward pulse thereto to forward bias said emitter and render said emitter circuit conductive.

References Cited in the file of this patent

UNITED STATES PATENTS

| | | |
|---|---|---|
| 2,937,298 | Putkovich | May 17, 1960 |

FOREIGN PATENTS

| | | |
|---|---|---|
| 1,142,181 | France | Mar. 25, 1957 |
| 783,914 | Great Britain | Oct. 2, 1957 |